Nov. 10, 1970 V. P. FREDRICKSEN 3,538,642
HORIZONTALLY SLIDING SASH WINDOWS
Filed Dec. 18, 1968 5 Sheets-Sheet 1
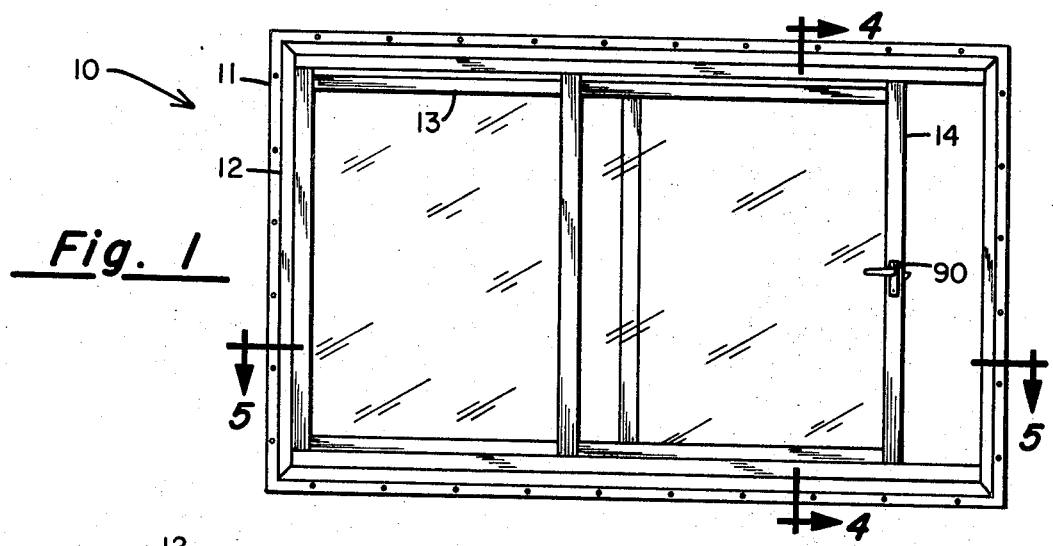
Fig. 1
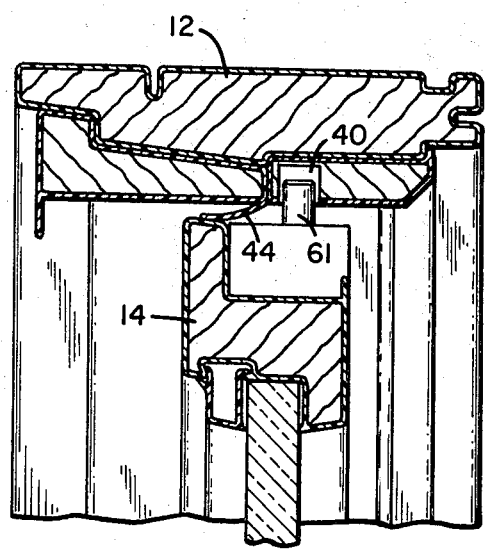
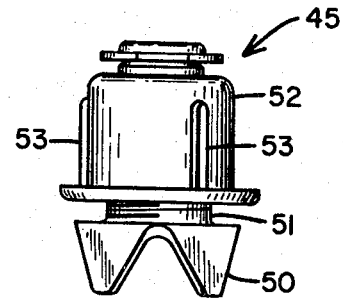
Fig. 8
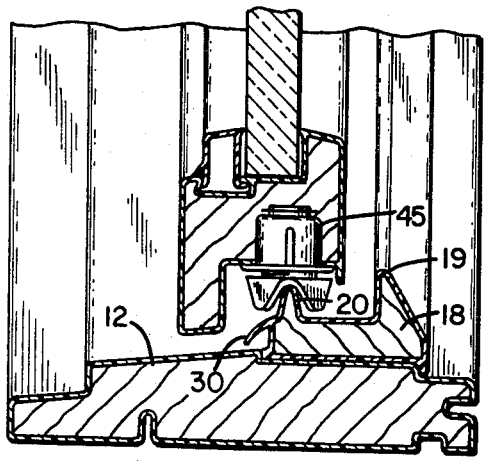
Fig. 4
INVENTOR
VERN P. FREDRICKSEN
BY
ATTORNEYS

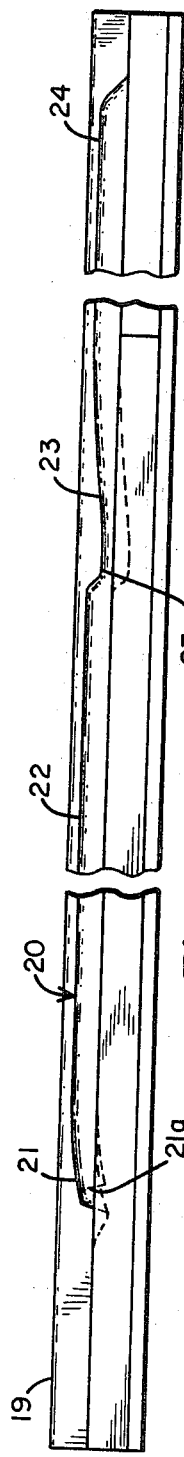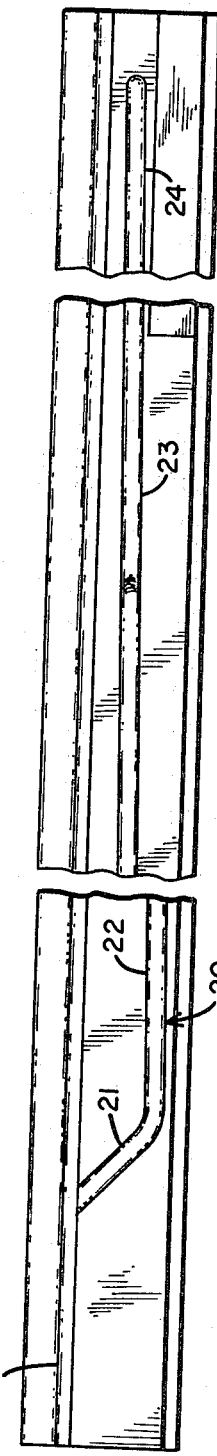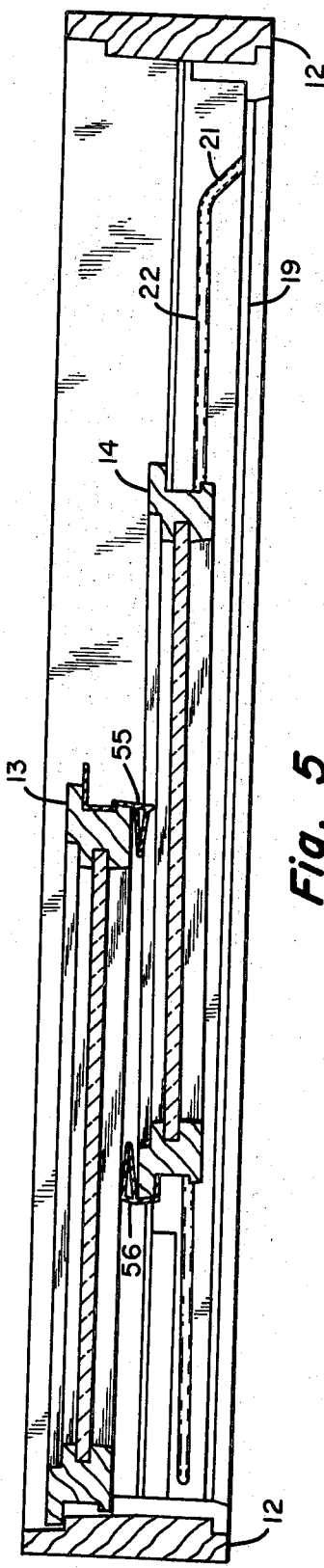

United States Patent Office 3,538,642
Patented Nov. 10, 1970

3,538,642
HORIZONTALLY SLIDING SASH WINDOWS
Vern P. Fredricksen, Bayport, Minn., assignor to Andersen Corporation, Bayport, Minn., a corporation of Minnesota
Filed Dec. 18, 1968, Ser. No. 784,586
Int. Cl. E05d 15/10
U.S. Cl. 49—213                                         2 Claims

ABSTRACT OF THE DISCLOSURE

A window construction having an extruded track located in the lower portion of the frame for slidably guiding a sash in a weather-sealed relation against the frame.

BACKGROUND OF THE INVENTION

Field of the invention

This invention relates mainly to window construction and, more specifically, to improvements in tracks for sliding sash windows.

Description of the prior art

Horizontal sliding sash windows and hingedly mounted casement windows are well known in the art. Each of these windows has certain features that are desirable, for example, the hinged casement windows are easily opened and closed and provide a tight weather seal between the window frame and the sash. By rotating the sash of a hinged casement window about its hinges, one brings the sash into pressure contact with the weather stripping on the window frame thus producing a tight weather seal. The disadvantage of this window is that it is not readily removable and it generally protrudes outward when in the open position thus being susceptible to damage as well as being in the way. Furthermore, if the sash opens outward the screens must be on the inside thus allowing one to trap bugs between the sash and the screen when the sash is closed. On the other hand, sliding windows do not protrude outward but, they are not as easy to open and close as the hinged casement window because of the frictional engagement between the sash and the weather stripping in the frame. Furthermore, because of changes in humidity these sashes and frames sometimes swell and these windows become even harder to open and close. To minimize the problem of opening and closing these windows pulleys and counterweights have been used to counterbalance the frictional forces of the sash against the weather stripping.

Another method of reducing the frictional force is shown in Swanson et al. Pat. 2,317,312 where a recessed track is provided in the frame both above and below the sash. Guide pins located in the top of the sash follow the top track and guide pins located in the bottom of the sash follow the bottom track. With this arrangement the sash is guided in two directions, namely, laterally away from the weather stripping and longitudinally along the track. This type of sliding window eliminates some of the frictional forces found in horizontally sliding sash windows by guiding the sash laterally away from the frame during opening and closing thus providing clearance between the sash and frame. However, the recessed groove in the lower portion of the sill has been found to fill up with moisture and dirt thus making this window difficult to open and close. In order to regain the sliding action, it is necessary to remove the sash and clean out the track. Obviously, this is a nuisance for a person to clean the moisture and the dirt from the track as a person usually wants to open a window in a hurry to let in fresh air. However, even if the window is not opened or closed the moisture and dirt must be cleaned out because it produces an unsightly appearance. Also, because the guide pins are spring mounted and ride in the bottom of the track, they sometimes produce resistance to the opening and closing of the sash. Furthermore, if the guide pins did not ride on the bottom of the track there still is the frictional engagement between the bottom of the sash and the frame. In addition, it was necessary in these prior art devices to have an elaborate weather stripping in the lower portion of the sash to allow any moisture that may flow along the base of the sash to discharge to the exterior.

To overcome the prior art problems of an unsightly appearing track that fills with moisture and dirt, the present invention provides a self-cleaning extruded track located in the lower sill. In addition, the track is so designed that when the window is moved from the locked position into the open position by a latching mechanism the sash is displaced in three directions from the weather stripping, namely, laterally, horizontally and vertically. This produces a minimum of frictional engagement between the sash and the frame so that an operator may readily slide the sash completely open. Yet when the sash is moved into the locked position it provides a tight weather seal between the sash and the frame because the latching mechanism forces the sash into a tight weather sealing relation with the weather stripping. Also, because the sash moves vertically downward as the sash moves into the closed position, the bottom of the sash engages the sill of the window in a weather sealing relation. This eliminates the need for a bulky elaborate weather stripping at the lower portion of the sash by allowing the sash to come into pressure contact with the bottom of the sill when in the closed position.

SUMMARY OF THE INVENTION

Briefly, the invention comprises an extruded self-cleaning track located on a window frame for slidably supporting a sash so that when one opens the window the sash is displaced laterally, longitudinally and vertically along the track so as to minimize resistance to opening and closing of the sash while still providing a tight weather seal between the sash and the frame when the sash is in the closed position.

BRIEF DESCRIPTION OF THE DRAWING

FIG. 1 is a front elevation view showing a typical horizontal sliding sash for use with the invention;

FIG. 2 is a front elevational view of the extruded track for guiding a slidable sash;

FIG. 3 is a top view of my extruded track for guiding the bottom of a slidable sash;

FIG. 4 is a cross-section view taken through line 4—4 of FIG. 1 showing the slidable sash and extruded track in cross-section;

FIG. 5 is a cross-sectional view taken along line 5—5 of FIG. 1 showing the window in horizontal cross-section;

FIG. 8 is a front elevation view of a gliding mechanism for slidably engaging my extruded track;

DESCRIPTION OF THE PREFERRED EMBODIMENT

Figure 6:
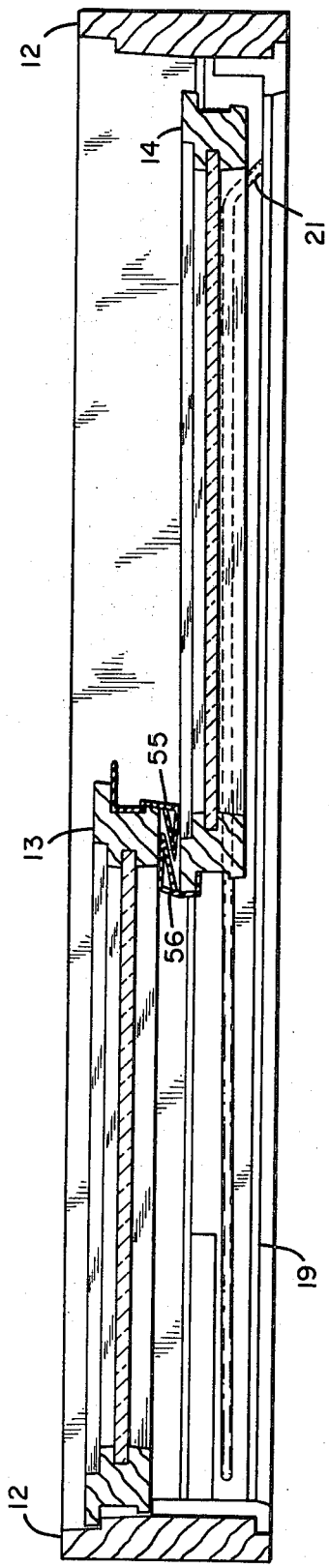
FIG. 6 is a cross-sectional view similar to FIG. 5 but showing the position of the sliding sash in a position where the latching mechanism can engage a holding member in the frame.

Referring to FIG. 1, reference numeral 10 generally designates a horizontally sliding window comprising a frame 12 having a marginal nailing flange 11 located therearound. Mounted within frame 12 is a permanently mounted sash 13 and a slidable mounted sash 14 for slidable engagement with an extruded track. Although FIG. 1 shows only one slidable sash, it will be apparent to those skilled in the art that two or more slidable mounted sashes could be used in the present invention.

Referring to FIG. 2, 3, 4 and 5, reference numeral 18 generally designates a vinyl covered sill section containing the extruded, self-cleaning, three dimensional, sash track 20. Track 20 is extruded directly in the vinyl covered sill section 18 which fastens to frame 12. Although track 20 could be made from other materials, it is preferable to have it formed as an integral part of sill 18. This eliminates problems in maintaining track 20 securely mounted to sill 18 as well as producing a weather-tight seal between track 20 and sill section 18.

Sill section 18 is substantially rectangular having a straight jamb 19 for tightly contacting and holding the inside of sash 14 when sash 14 is in the closed position. To ensure that there is a weather-tight seal between the exterior and the interior of window 10, there is provided a leaf type resilient stripping 30 that fastens directly to the edge of sill section 18. When sash 14 is in the closed position, the lower portion of sash 14 pushes firmly against resilient weather stripping 30 thus forming a weather-tight seal.

As sash 14 slides from a closed to an open position, track 20 guides sash 14 in three directions so as to reduce frictional contact of sash 14 with frame 12. To provide this three dimensional guidance of sash 14, there are provided four track sections. The first section is a first biangulated section 21 that forms a 45° angle with jamb 19. Section 21 also angles downward slightly producing a varying elevation of section 21 which guides sash 14 downward as it is pulled into the closed position. Smoothly connected to section 21 is a first straight section 22 that forms a 10° angle with jamb 19. Straight section 22 is maintained at a uniform elevation and smoothly connects to a second biangulated section 23. Section 23 also forms a 10° angle with jamb 19 but contains a varying elevation (FIG. 2) for guiding sash 14 downward as it is moved into a closed position. Similarly, smoothly connected to biangulated section 23 is a second straight section 24 that is located parallel to jamb 19. Section 24, similar to section 22, is of a uniform elevation. Although sections 21–24 contain various elevations and different angles, they are smoothly and continuously joined in an end-to-end relation so that a glide mechanism for supporting a sash will pass freely from one section to another. While specific angles were referred to for the various sections, it is apparent that these are by way of illustration only and no limitation is intended thereto.

FIG. 4 and FIG. 8 show a first glide mechanism 45 that fits in the underside of sash 14. The bottom of sash 14 also contains a second glide mechanism (not shown) located a predetermined distance from glide mechanism 45. The distance between first glide mechanism 45 and the second glide mechanism is determined by the lowest elevation of section 21 and section 23 of track 20. That is, when sash 14 is moved into the closed position it is desired to have the two glide mechanisms at the lowest elevation of section 21 and section 23. This allows sash 14 to move downward so that frame 12 supports the extra weight of sash 14 when sash 14 is moved into the closed position. As the two glide mechanisms are identical, only gliding mechanism 45 will be described in greater detail. Gliding mechanism 45 comprises a U-shaped follower 50 for slidably engaging track 20. Follower 50 has a threaded portion 51 that fits into a threaded sleeve 52. Threaded sleeve 52 fits into a cylindrical hole in the underside of sash 14. The outer diameter of the hole in the underside of sash 14 is slightly larger than the diameter of the main body of sleeve 52 but smaller than the diameter of the outermost portion of wedge-shaped ridges 53 on sleeve 52. Thus sleeve 52 can be securely mounted in sash 14 by forcing wedge-shaped ridges 53 into the hole in the underside of sash 14. The threaded connection between follower 50 and sleeve 52 provides a dual function. First, it allows the follower to rotate as it follows the angled sections of track 20 and second, it provides adjustment for the height of sash 14 in frame 12. Typically, the thread size may be 32 threads per inch which provides a 1/64" adjustment per half revolution of the follower. However, this is by way of example only and no limitation is intended thereto.

Referring to FIG. 4, there is shown a second track 40 that is located in the top of frame 12. Track 40 is a recessed groove similar to the previously described prior art tracks but as it is located in the top of the frame it does not fill with moisture and dirt. Track 40 is located directly above track 20 and extends laterally along the top of frame 12. A top guide mechanism 60 mounted in sash 14 has a guide pin 61 extending therefrom that follows track 40 maintaining sash 14 in a vertical orientation as it is moved from an open to a closed position or vice versa. To provide a weather seal between the top of sash 14 and frame 12 there is a resilient leaf type weather strip 44. Besides forming a weather tight seal, weather strip 44 also exerts a slight downward pressure on the top of sash 14. This permits sash 14 from rattling in the wind as it would do if it were mounted completely free. Because the top of sash 14 is vinyl covered and weather stripping 44 is also formed from a vinyl type material, the pressure engagement of weather stripping 44 against the top of sash 14 provides a minimum of frictional resistance.

Figure 9:
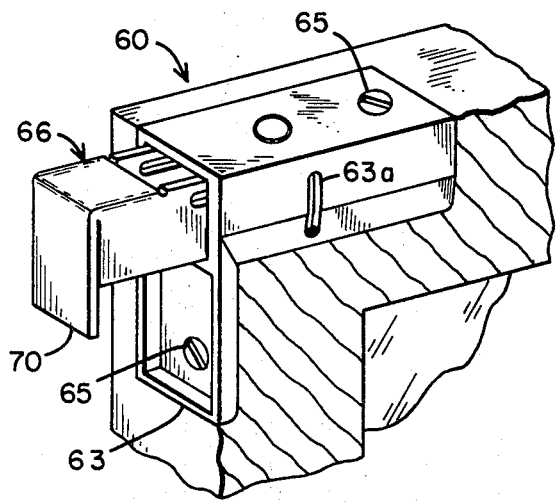
FIG. 9 is a pictorial view of the top guide mechanism.

FIG. 9 shows guide mechanism 60 containing a vertically movable guide pin 61 that extends into track 40 in sash 14. By pulling an inner slidable member outward, guide pin 61 can be retracted to allow sash 14 to be removed from frame 12.

Figure 10:
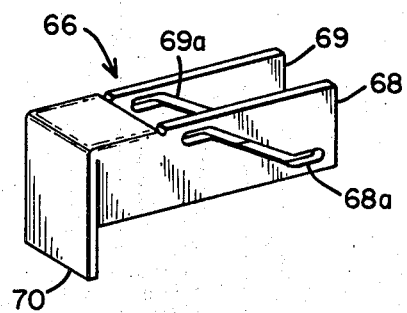
FIG. 10 is a pictorial view of a slidable member located in the top guide mechanism.
Figure 13:
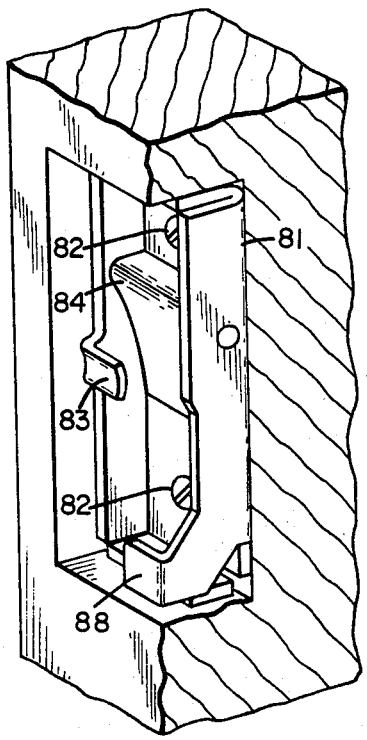
FIG. 13 is a pictorial view of the latch mechanism holding member mounted in the frame.

Referring to FIGS. 9, 10, 11 and 12, top guide mechanism 60 is shown in greater detail. FIG. 9 shows guide mechanism 60 comprising an L-shaped member 63 that rigidly fastens to the top corner of sash 14 through a pair of screws 65. Located within member 63 is a slidable member 66. A downwardly extending tab 70 on side member 66 allows an operator to readily pull member 66 outward to retract pin 61 or to push member 66 inward to extend guide 61 upward into track 40. FIG. 10 more clearly shows slidable member 66 comprising a pair of rectangular parallel members 68 and 69 that are laterally slidable along the inside of member 63. Located in member 68 is a diagonal elongated slot 68a and located in member 69 is a diagonal elongated slot 69a. Similarly, located on one side of housing member 63 is an elongated slot 63a and located on the other side of housing member 63 is a second parallel vertical elongated slot (not shown).

Figure 11:
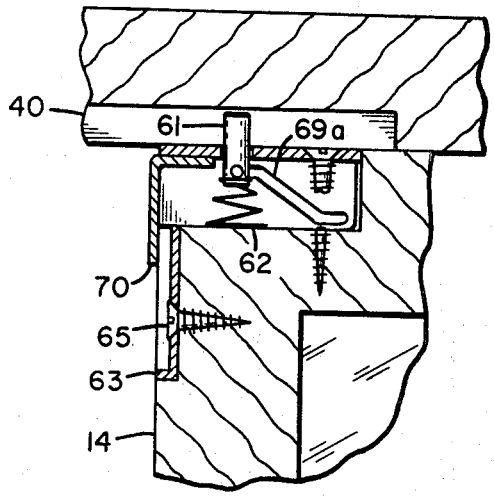
FIG. 11 is a front sectional view of the top guide mechanism with the guide pin in an extended position.
Figure 12:
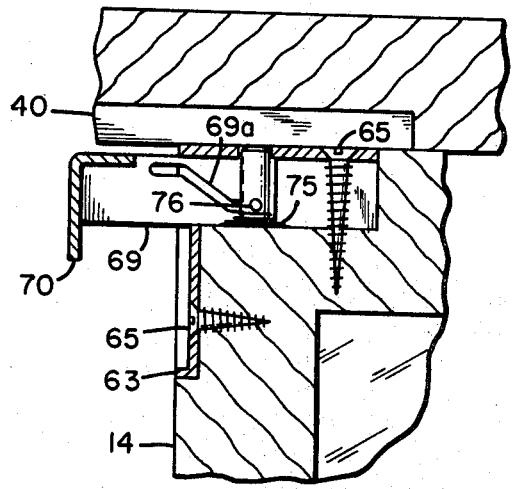
FIG. 12 is a front sectional view of the top guide mechanism with the guide pin in a retracted position.

FIGS. 11 and 12 show the inner portions of guide mechanism 60 in greater detail. A spring 75 abuts against sash 14 and the bottom of guide pin 61 to produce a force that holds guide pin 61 in an upward extending relationship. An elevation pin 76 extends perpendicularly through the center of guide pin 61. Elevation pin 76 extends outward sufficiently far from guide pin 61 to slidably engage the diagonal slots 68 and 69a in slidable member 68 and the vertical slots in housing member 63.

FIG. 11 shows guide pin 61 extended into track 40. In this position elevation pin 76 is located at the topmost portion of diagonal slot 69a and the topmost portion of the vertical slot (not shown) on the backside of member 63. Guide pin 61 is prevented from lateral movement by the engagement of elevation with the sides of the vertically extending slots in member 63. To retract guide pin 61 an operator inserts his finger under tab 70 and pulls outward on slidable member 66. As slidable member 66 moves outward, elevation pin 76 moves vertically downward in the slots in housing 63 by the wedging motion of diagonal slots 68a and 69a against elevation pin 76. Conversely, by pushing inward on member 66 the wedging action between elevation pin 76 and diagonal slots 68a and 69a extends guide pin 61 into track 40 in frame 12. Thus, it is apparent that the retractable top guide mechanism readily allows a sash to be removed while also eliminating the unsightly appearance of conventional guide pins that extend completely through the sash.

In order to open and shut the sash, there is provided a two part latching mechanism comprising one part having a lever handle that fits in sash 14 and one part having a hook mechanism that fits in frame 12. Briefly, turning the handle counterclockwise on the latching mechanism pulls the sash into a tight weather sealing relationship against the weather stripping and turning the handle clockwise pushes the sash away from the frame thus breaking the tight weather sealing relation between the sash and the frame.

FIGS. 13, 14, 15 and 16 show the latch mechanism comprising a sash mounted lever mechanism 80 rectangularly shaped and a frame mounted member 81. Frame mounted member 81 is mounted in frame 12 through a pair of screws 82. Member 81 has an inward extending tab 83 for engaging the front of an arcuate member located in lever mechanism 80 and an inclined section 84 for engaging the back of the arcuate member located in lever mechanism 80. Member 81 also has a second inward extending tab 88 that engages a lever lock member 94 in lever mechanism.

Figure 14:
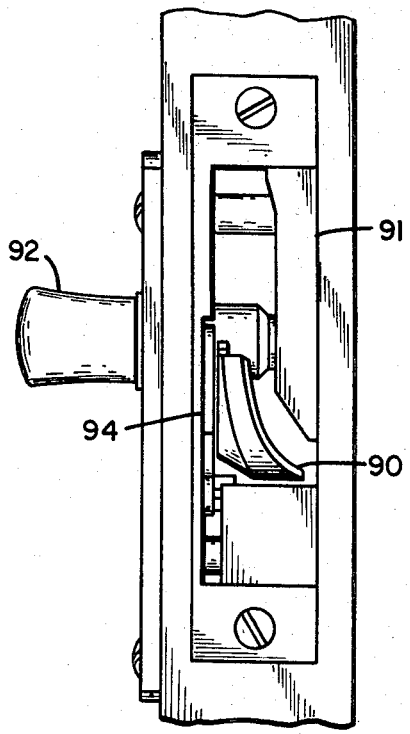
FIG. 14 is an end view of the latching mechanism mounted in the sash.
Figure 15:
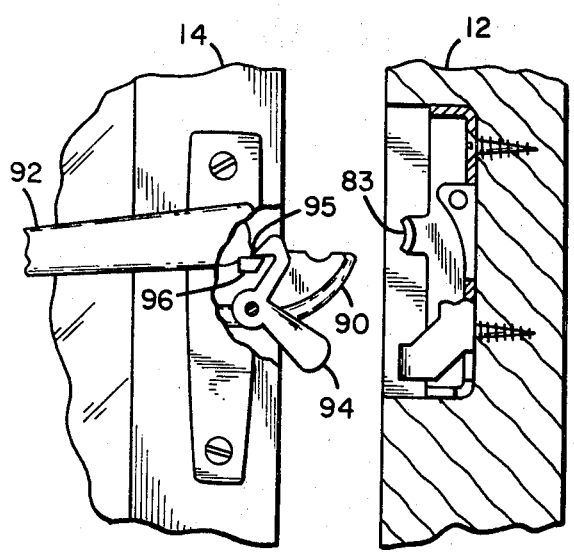
FIG. 15 is a front view partially in section of the latching mechanism in the open position.
Figure 16:
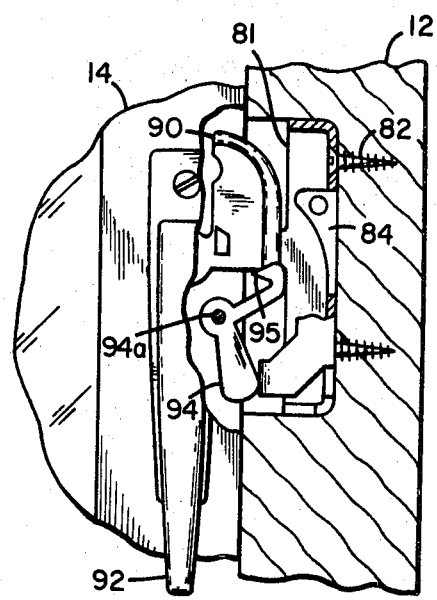
FIG. 16 is a front view partially in section of the latching mechanism in the closed position.

Rotatably mounted in lever mechanism 80 is a half-moon shaped arcuate latching member 90. A lever handle 92 connects to arcuate member 90 allowing an operator to rotate arcuate member 90 from an open to a closed position, or vice versa, by merely turning lever handle 92 (FIG. 15 shows the lever mechanism in an open position and FIG. 16 shows the lever mechanism in a closed position). Also rotatably mounted in lever mechanism 80 is a right angle shaped lever lock 94. Lever lock 94 has a hook 95 on one end for engaging a pin 96 located on member 90. A spring (not shown) provides a counterclockwise force on latch 94 thus holding hook 95 over pin 96 when latch 94 is in the open position (FIG. 15). This prevents lever mechanism 80 from being inadvertently moved to the closed position when sash 14 is in the open position. By referring to FIGS. 14, 15 and 16, the general shape of arcuate member 90 can be determined. FIG. 14 shows that one side of arcuate member 90 is angled or ramped. This side of arcuate member 90 engages tab 83 and pulls the sash laterally when the sash is brought into the closed position. FIGS. 15 and 16 show the half-moon shape of arcuate member 90 that engages ramp section 84 when the sash is moved from the closed position to the open position.

Referring to FIGS. 15 and 16, the operation of the lever mechanism 80 and member 81 will now be described in greater detail. First, sash 14 is moved toward frame 12 until arcuate member 90 extends underneath tab 83. Also, as sash 14 is moved proximate frame 12, tab 88 engages the bottom portion of lever lock 94 thus pivoting lever lock 94 about pin 94a. This releases lever handle 92 so that it can be rotated in a counterclockwise direction. With arcuate member 90 located beneath tab 83, the counterclockwise rotation of lever handle 92 causes arcuate member 90 to engage tab 83 as arcuate member 90 is rotated upward. The upward rotation of arcuate member 90 pulls sash 14 toward frame 12. Also, as member 90 is rotated upward the angled portion of arcuate member 90 pushes against the side of tab 83 thus pushing sash 14 toward the operator. Thus, the latch mechanism pulls sash 14 into a tight sealing relation with frame 12.

To open sash 14 an operator merely rotates the handle in the clockwise direction which causes the back portion or arcuate member 90 to engage ramp 84. As arcuate member 90 continues to rotate clockwise, it pushes sash 14 away from frame 12 along the upper and lower tracks. Thus it frees sash 14 from the tight weather sealing relationship with frame 12. By freeing sash 14 from the tight weather sealing relationship with frame 12 an operator can readily slide sash 14 to an open position with a minimum of effort. To prevent an operator from inadvertently trying to close the sash with the lever handle 92 in the locked position, hook 95 engages member 95 preventing it from being rotated counterclockwise when it is in the open position. Thus, when an operator is readily to close the window it is apparent that arcuate member 10 will always be in a proper position because of the locking engagement of hook 95 with top 96.

Figure 7:
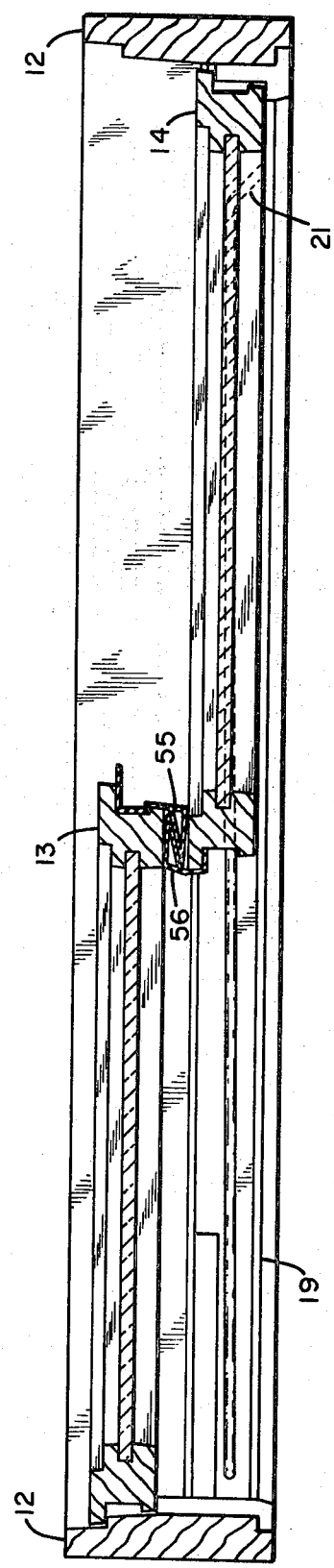
FIG. 7 is a cross-sectional view similar to FIG. 5 showing the position of the inner sash in the closed position.

In order to more fully understand the operation of window 10, sash 14 is shown in the semiopen position (FIG. 5), the ejected position (FIG. 6) and the closed position (FIG. 7). It will be assumed that sash 14 is in the closed position and that an operator desires to move it to the open position. To open sash 14 an operator turns the handle on latching mechanism 90 which displaces sash 14 along first biangular section 21 of track 20. The aforedescribed geometry of section 21 displaces sash 14 in three planes, namely, laterally away from the front of the window, upward and longitudinal along track 20. This displacement frees sash 14 from frictional engagement with the weather stripping on the frame. Sash 14 is now in the ejected position (FIG. 6).

With sash 14 in the ejected position an operator can grasp the edge of sash 14 and push it along track 20 to the desired opening. The angling section 22 of track 20 allows sash 14 to slide to the semiopen or fully opened position without ever coming in contact with weather stripping located on the bottom side and side jamb.

FIGS. 5, 6 and 7 also show hook shaped interlocking weather strips 55 and 56 mounted respectively on permanently mounted sash 13 and slidable mounted sash 14. This type of weather strip produces a tight weather seal when sash 14 is in the closed position and produces no frictional engagement as sash 14 is moved from the closed position (FIG. 7) to the ejected position (FIG. 6).

To close sash 14 an operator must reverse the procedure by grasping sash 14 and pulling it until it is in the ejected position (FIG. 6). Then the operator turns the handle on latch mechanism 90 pulling sash 14 along track 20 and into a tight weather sealing relation with frame 12.

I claim:
1. A window construction comprising:
   a frame, including a sill;
   a sash slidably mounted in said frame;
   a first track located on said frame for slidably supporting said sash, said first track projecting above said sill to prevent moisture and dirt from accumulating in said first track, said first track having an arcuate section for guiding said sash in a side long and lengthwise manner, said first track having an elevated section for guiding said sash in an upward direction when said sash is brought into an open position from a tight weather-sealing relation with said frame;

a second track located in said frame for forming slidable engagement with the top side of said sash;

an adjustable rotatable track follower mounted in said sash for slidably engaging said first track in a self-cleaning relation, said follower rotatably mounted in said sash for following said arcuate section, said follower having a central axis, said follower being further rotatably adjustable about said central axis for changing the position of said sash with respect to said frame;

a latching mechanism, said latching mechanism including means operable for forcing said sash into a weather-sealing relation in said frame when said sash is partially displaced from said frame, said means further operable for partially displacing said sash from said frame when said sash is in a weather-sealing relation in said frame; and a marginal weather stripping located on said window construction for forming a weather sealing relation between said sash and said frame when said sash is in a closed position.

2. The invention as described in claim 1 wherein said latching mechanism contains an arcuate engaging member for moving said slidable sash into a weather-sealing relation in said frame.

References Cited
UNITED STATES PATENTS

| | | | |
|---|---|---|---|
| 2,317,312 | 4/1943 | Swanson et al. | 49—449 XR |
| 2,747,240 | 5/1956 | Peterson | 49—425 |
| 2,952,883 | 9/1960 | Kessler et al. | 49—449 XR |
| 3,080,023 | 3/1963 | Armstrong | 49—413 XR |
| 3,225,393 | 12/1965 | Coller | 49—213 |

KENNETH DOWNEY, Primary Examiner

U.S. Cl. X.R.

49—225, 449, 453